UNITED STATES PATENT OFFICE.

ALICE MACLEOD, OF SAN JOSE, CALIFORNIA.

COMPOSITION OF FRUIT MATTER FOR FOOD PRODUCTION.

1,225,450.

Specification of Letters Patent.

Patented May 8, 1917.

No Drawing.

Application filed July 18, 1916. Serial No. 109,960.

*To all whom it may concern:*

Be it known that I, ALICE MACLEOD, a citizen of the United States, residing at 157 East St. John street, San Jose, in the county of Santa Clara and State of California, have invented a new and useful Composition of Fruit Matter for Food Production.

My composition consists of the following ingredients, combined in the proportions stated, viz:

| | |
|---|---|
| Water substantially pure | 10 gallons. |
| Prune pulp from cured prunes | 150 pounds. |
| Olive pulp from cured olives | 100 pounds. |
| Garlic | 1 pound. |
| Fine salt | 1½ pounds. |
| Ground red pepper | 1 ounce. |
| Ground ginger | 1 ounce. |
| Ground cloves | 1 ounce. |
| Ground cinnamon | 1 ounce. |
| Vinegar substantially pure | 5 quarts. |

These ingredients are to be thoroughly mingled by agitation while in a heated state, and put up in cans or bottles well sealed, ready for future use, the same making a very complete and valuable food product, as the fat contained in the olive pulp added to the sugar and the nitrogenous matter of the cured prune pulp with the other ingredients provide a perfect, palatable and nutritious food product.

Having thus described my invention, what I desire to claim and secure by Letters Patent is:

The herein described composition of matter, compounded in the manner and in the quantities substantially as described, consisting of water substantially pure, prune pulp from cured prunes, olive pulp from cured olives, garlic, fine salt, ground red pepper, ground ginger, ground cloves, ground cinnamon, vinegar substantially pure, substantially as described and for the purpose specified.

ALICE MACLEOD.

Witnesses:
   T. E. PEISER,
   LE ROY CHARLES.

Copies of this patent may be obtained for five cents each, by addressing the "Commissioner of Patents, Washington, D. C."